Figure 1:
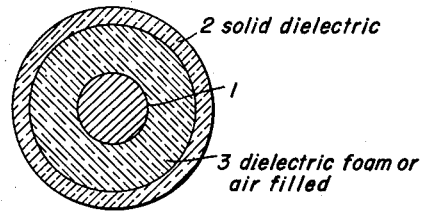

June 19, 1962  J. W. E. GRIEMSMANN  3,040,278
BROAD-BAND SINGLE-WIRE TRANSMISSION LINE
Filed June 30, 1958  2 Sheets-Sheet 1

INVENTOR
JOHN W. E. GRIEMSMANN
BY Ralph B. Stewart
ATTORNEY ns Patent Office
3,040,278
Patented June 19, 1962

1

3,040,278
BROAD-BAND SINGLE-WIRE TRANSMISSION LINE
John W. E. Griemsmann, Bellaire, N.Y., assignor to Polytechnic Institute of Brooklyn, Brooklyn, N.Y., a corporation of New York
Filed June 30, 1958, Ser. No. 745,446
5 Claims. (Cl. 333—95)

This invention relates to transmission lines of the surface-wave type, that is, of the Goubau type which is composed of a single metallic conductor surrounded by a layer of dielectric material. The present invention constitutes an improvement upon the Goubau type of line.

In the Goubau type of line, the field decays exponentially in a radial direction away from the wire such that at sufficiently high frequencies the effective cross-section of the line becomes of practical dimensions and can be used to transmit high powers. One difficulty with this line is that as the frequency is increased beyond that of reasonable cross-section the effective cross-section decreases rapidly, bringing with it much higher attenuation, which is primarily caused by increased dissipation in the metallic wire.

This invention is useful in transmitting waves in substantially the same frequency ranges as those for which the Goubau line is used.

One object of the present invention is to devise a single-wire transmission line having lower attenuation than the conventional Goubau line of the same wire diameter.

According to the present invention the dielectric covering for the single wire conductor is designed to have different dielectric constants at different radial distances from the surface of the conductor.

The dielectric covering may be formed of two or more concentric tubes or layers of dielectric material of different dielectric constants, the material in contact with the conductor surface being of low dielectric constant, not substantially greater than 1, and the dielectric constant of the other layers increasing with increase in radial distance from the conductor surface.

Alternatively, the covering may be formed of the same material throughout its extent, but being of a porous structure which is graded in density from a very porous structure at the surface of the conductor to a dense structure at the outer surface of the covering.

According to one form of the invention, the single wire conductor is supported at the center of a dielectric tube having an inside diameter larger than the external diameter of the wire. The annular space surrounding the wire within the dielectric tube may be air-filled or filled with dielectric material of very low dielectric constant, while the dielectric tube itself is formed of a material of high dielectric constant. The outer dielectric tube is designed to have a thickness to assure appropriate radial field decay for a specified frequency. The thickness of the inner dielectric tube, or the thickness of the annular space within the outer tube and surrounding the wire, is selected to equalize the attenuation as a function of frequency, and this results in reduction in attenuation for all frequencies, especially in the high frequencies. This effect is due to the tendency of the field at high frequency to draw into the dielectric of the highest dielectric constant and thus draw away from the conducting wire.

The broad-band characteristic improves steadily as the annular space between the wire and the outer dielectric tube increases in thickness.

Figure 2:
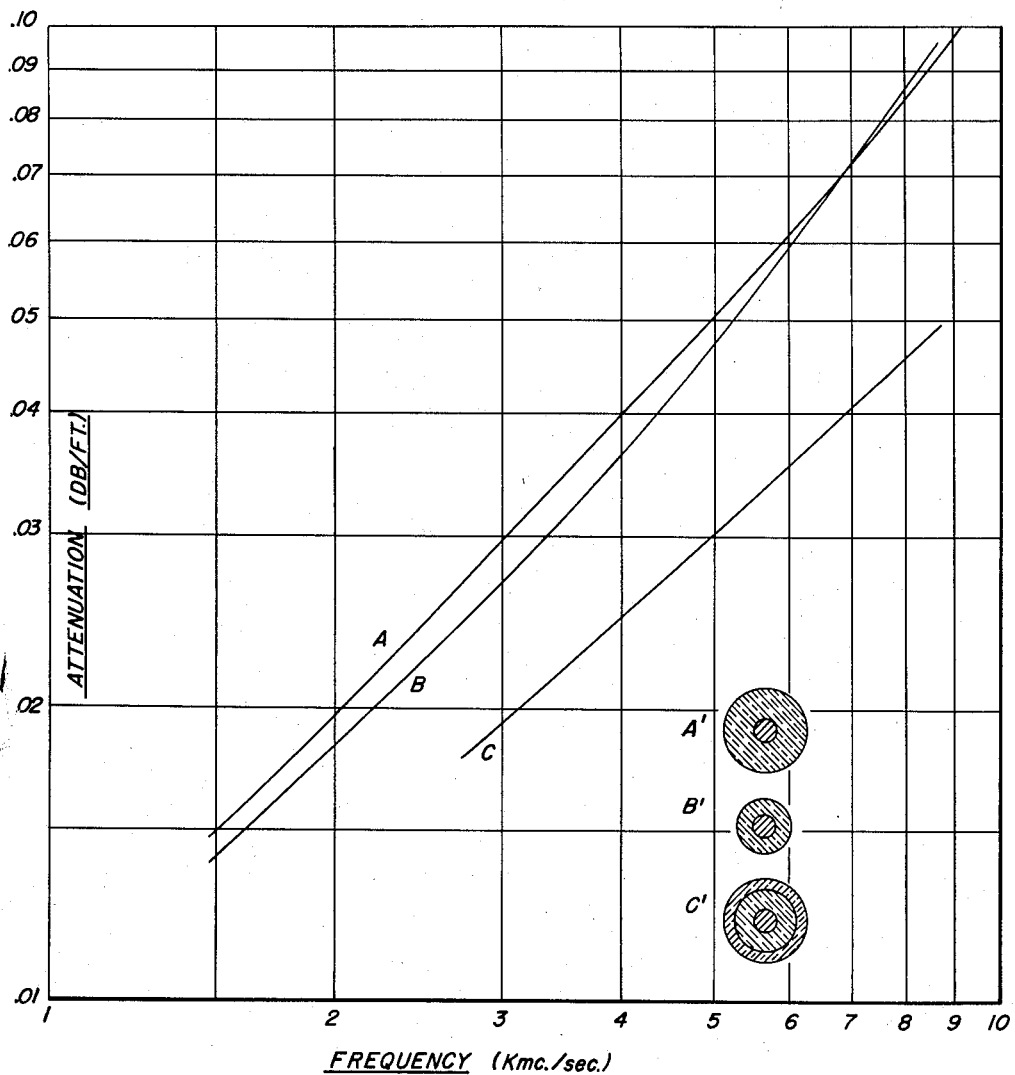

My invention is illustrated in the accompanying drawing in which FIG. 1 is a transverse sectional view of my improved transmission line; FIG. 2 is a diagram of curves showing how the attenuation of my improved line varies with frequency by comparison with two different forms of

2

Figure 3:
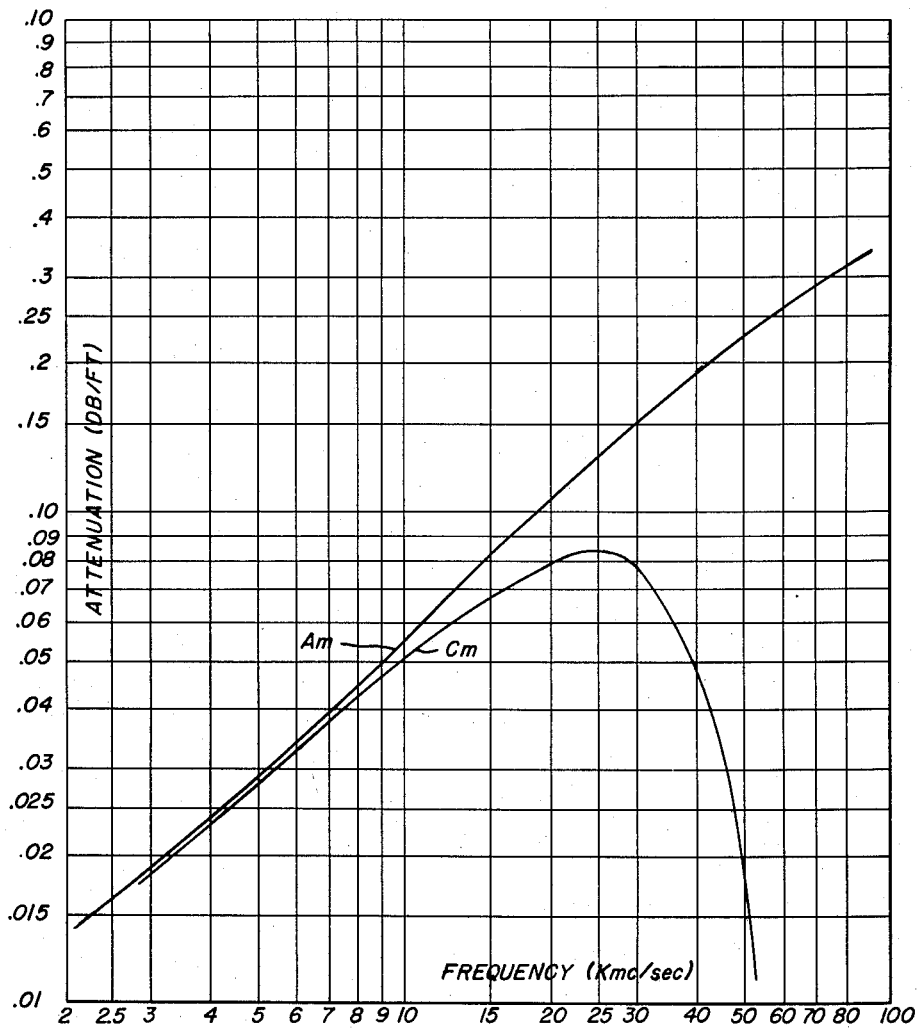

Goubau line within a certain frequency range; and FIGURE 3 is a diagram of curves showing how attenuation caused by metal losses varies over a wider frequency range.

Referring to FIG. 1, my improved line is formed of an inner conductor 1 surrounded by a dielectric tube 2. In the most convenient form, the conductor 1 and the tube 2 are both cylindrical, and this form will be used for illustrative purposes. Tube 2 has an internal diameter substantially greater than the external diameter of conductor 1, leaving an annular space 3 within tube 2 and surrounding conductor 1. This pace may be filled with dielectric material of low dielectric constant, or it may be air-filled except for such dielectric material as is necessary to support the conductor 1 within the tube 2. For example, the conductor 1 may be supported within the tube 2 by any known arrangement for supporting the inner conductor of a co-axial cable, as by thin dielectric washers mounted on conductor 1 and spaced at points along its length, or it may be supported in any other desired manner, the main consideration being that the annular space 3 should be occupied by a dielectric of low dielectric constant by comparison with that of the tube 2.

A suitable material for filling the annular space 3 and supporting conductor 1 in tube 2 is dielectric foam which may be obtained commercially. Such foams may be made from polystyrene, polyethylene, or epoxy resins.

The dielectric occupying the annular space 3 should have a dielectric constant not substantially greater than 1, for example, around 1.05, and this material when in the form of dielectric foam should preferably weigh less than 2 pounds per cubic foot.

The tube 2 should be formed of dielectric material having a moderate dielectric constant, that is, greater than 1. For example, the tube may be formed of solid polystyrene or solid polyethylene. The dielectric constant should be 2.25 (polyethylene) or greater, and the loss tangent preferably should be less than 0.0004.

The thickness of the annular dielectric space 3 is selected so as to equalize attenuation as a function of frequency. Calculations show that this can be done so that the attenuation is reduced for all frequencies but to a greater extent at the high frequencies. This improvement is obtained principally because the dielectric is subjected to lesser electric field as a consequence of being positioned at a greater radius than the Goubau line. For sufficiently high frequencies further improvement can be obtained by virtue of the field being drawn away from the wire. The spread of the field outside of the tube 2 is controlled by the thickness of the tube and its dielectric constant. The thicker the dielectric and the greater the dielectric constant, the smaller will be the spread of the field, but favoring this condition leads to greater attenuation at higher frequencies. For a given band-width, a choice must be made between field spread and attenuation. The various dimensions and constants are interrelated in a rather complicated manner, but for practical purposes the ratio between the thickness of the annular space 3 and the wall-thickness of the tube 2 should be greater than 1 and less than 6. Also, the ratio between the electrical wall-thickness of the tube 2 and the free-space wavelength should be greater than 0.01 and smaller than 2.0.

The three curves in FIG. 2 show how the attenuation varies with frequency in three different lines over a frequency range from 1 to 10 kmc./sec. Curves A and B show the attenuation for two different designs of Goubau lines as shown in the diagrams A' and B', and curve C shows the attenuation for my improved line shown in diagram C'. In all three cases the inner conductor is of the same size, ⅛ inch in diameter. For line A', the dielectric sleeve covering the wire has an outside diameter of ½ inch and a dielectric constant of 1.145. For line B', the dielectric sleeve covering the wire has an outside diameter of ¼ inch and a dielectric constant of 2.56. In my improved line shown at C' the outer dielectric sleeve has an internal diameter of ⅜ of an inch and an external diameter of ½ inch and a dielectric constant of 2.56. The annular space between the inner conductor and the outer sleeve is assumed to be air-filled. All dielectrics are assumed to have the same loss tangent of $3.5 \times 10^{-4}$, and the conductivity of the inner conductor is $1.43 \times 10^7$ mho/meter.

The attenuation for curves A and B is obtained from the sum of the metal and dielectric losses as determined by the use of well-known formulas applying to the Goubau line. The attenuation for curve C is obtained from the sum of the metal and dielectric losses as determined by modified Goubau equations set forth below.

The attenuation caused by dielectric loss for line C' ($\alpha_d$ in nepers/meter) is represented by the following equation, where the inner conductor has a radius $a$, the outer sleeve 2 has an external radius $b$, and an internal radius of $d$:

$$\alpha_d = \left(\frac{\pi k_\epsilon \phi}{\lambda_0}\right)\left(\frac{\lambda_g}{\lambda_0}\right)\left[\frac{\gamma^2\left\{1+\frac{V^2 K_1^2(w)}{W^2 k_\epsilon^2 K_0^2(w)}+\frac{2}{wk_\epsilon^2}\left(\frac{\lambda_0}{\lambda_g}\right)^2\frac{K_1(w)}{K_0(w)}\right\}-C_2^2\left\{\frac{\alpha^2 V^2}{W^2 k_\epsilon^2}+\beta^2-\frac{2\alpha\beta}{C_2}\frac{1}{Wk_\epsilon^2}\left(\frac{\lambda_0}{\lambda_g}\right)^2\right\}}{\gamma^2\left\{\frac{V^2+k_\epsilon W^2}{W^2 k_\epsilon}+\frac{2K_1(w)}{Wk_\epsilon K_0(w)}\left(\frac{V^2+W^2}{W^2}\right)-\frac{V^2}{W^2}\left(\frac{k_\epsilon-1}{k_\epsilon^2}\right)\frac{K_1^2(w)}{K_0^2(w)}\right\}-C_2^2\left\{\frac{V^2\alpha^2(1-k_\epsilon)}{W^2 k_\epsilon^2}+\beta^2\left(\frac{V^2+W^2 k_\epsilon}{W^2 k_\epsilon}\right)-\frac{2\alpha\beta}{C_2}\left(\frac{V^2+W^2}{W^3 k_\epsilon}\right)+\frac{V^2}{W^4 k_\epsilon C_2^2}\right\}}\right]$$

(1)

The attenuation caused by metal loss for the line C' is represented by the following equation:

$$\alpha_c = \frac{\frac{V^2}{k_\epsilon^2 W^2 (WC_1)^2}\left(\frac{R_s k_\epsilon C_1 \lambda_g}{\eta_0 b \lambda_0}\right)}{\lambda^2\left\{\frac{V^2+k_\epsilon W^2}{W^2 k_\epsilon}+\frac{2K_1(w)}{Wk_\epsilon K_0(w)}\left(\frac{V^2+W^2}{W^2}\right)-\frac{V^2}{W^2}\left(\frac{k_\epsilon-1}{k_\epsilon^2}\right)\frac{K_1^2(w)}{K_0^2(w)}\right\}-C_2^2\left\{\frac{V^2\alpha^2(1-k_\epsilon)}{W^2 k_\epsilon^2}+\beta^2\left(\frac{V^2+W^2 k_\epsilon}{W^2 k_\epsilon}\right)-\frac{2\alpha\beta}{C_2}\left(\frac{V^2+W^2}{W^3 k_\epsilon}\right)+\frac{V^2}{W^4 k_\epsilon C_2^2}\right\}}$$

(2)

The terms employed in Equations 1 and 2 are defined as follows:

$K_\epsilon$ = relative dielectric constant of the dielectric
$V^2 = b^2(k^2 k_\epsilon - k^2 z)$
$W^2 = -b^2(k^2 - k^2 z)$
$k^2 = \omega^2 \mu_0 \epsilon_0$; $\omega = 2\pi f$; $f$ = transmission frequency, cycles/sec.
$\alpha = I_0(wc_1)K_1(wc_2) + I_1(wc_2)K_0(wc_1)$
$\beta = I_0(wc_2)K_0(wc_1) - I_0(wc_1)K_0(wc_2)$
$\gamma^2 = \left(\frac{\pi v c_2}{2}\right)^2 \left[\alpha \frac{v}{wk\epsilon}\left|\frac{J_0(v)N_0(v)}{J_0(vc_2)N_0(vc_2)}\right| - \beta \left|\frac{J_0(v)N_0(v)}{J_1(vc_2)N_1(vc_2)}\right|\right]^2$
$\mu_0$ = permeability of free space = $4\pi \times 10^{-7}$ henry/meter
$\epsilon_0$ = dielectric constant of free space = $\frac{1}{36\pi} \times 10^{-9}$ farad/meter
$k_z = 2\pi/\lambda_g$;
$\lambda_0 = 2\pi/k$, wavelength in air;
$\lambda_g$ = guide wavelength, meters corresponding to $f$, meters
$\phi$ is the loss tangent of the dielectric material
$c_1 = a/b$, $c_2 = d/b$
$R_s$ = surface resistance of metal, ohms (see "Fields and Waves in Modern Radio," Ramo & Whinnery, John Wiley & Sons, First Edition, pages 209-211 and 206.
$\eta_0 = \sqrt{\mu_0/\epsilon_0}$, free space wave impedance, ohms $$\left(\frac{\lambda_g}{\lambda_0}\right)^2 = \frac{V^2+W^2}{V^2+k_\epsilon W^2}; \quad \left(\frac{b}{\lambda_0}\right)^2 = \frac{V^2+W^2}{4\pi^2(k_\epsilon-1)}$$

The functions $I_0(x)$, $I_1(x)$, $K_0(x)$, $K_1(x)$, $J_0(x)$, $J_1(x)$, $N_0(x)$, and $N_1(x)$ are various forms of Bessel functions of the argument $x$ defined and tabulated in British Association Mathematical Tables, Vol. VI, Bessel Functions, Part 1, University Press, Cambridge 1950.

From the curves shown in FIG. 2 it will be seen that the dielectric loss of my improved line represented at C' is less than that of the normal Goubau line of the same wire diameter and the same dielectric thickness, compared to curve A and curve C, and line A' and C'. This is due to the fact that the dielectric tube or sleeve in my improved line is located in an electric field of less intensity than in the Gaubau line A', and this is due to the concentration of the dielectric in my improved line at a greater radius from the axis of the conductor.

The improvement in broad-band characteristic is not readily apparent geometrically from the curves in FIG. 2, but it will be found that at 3 kmc./sec., the attenuation for curve C is approximately 80% of B and 67% of A. At 7 kmc./sec., the attenuation in curve C is only 64% of the attenuation in curves A and B.

In FIG. 3 curves A$m$ and C$m$ show how the attenuation due to metal losses for lines A' and C' varies over a wider range of frequency (2 kmc./sec. to 50 kmc./sec.). It will be seen that for line C' the contribution of metal losses to attenuation becomes less and less and begins to decrease at a point between 25 and 30 kmc./sec. and drops sharply up to 50 kmc./sec. On the other hand, in the case of line A' the metal loss contribution increases with frequency throughout the entire frequency range.

Thus, FIGURE 3 indicates the possibility of better broad-band characteristics above 10 kmc./sec.

Where the covering is made of the same porous material throughout, the covering is formed initially as a porous structure of the same density as that required at the outer surface of the conductor but of increased outer diameter. It is then drawn through a hot die to compress the outer portion of the covering and increase its density.

I claim:

1. A surface wave transmission line comprising a single conductor formed of a metal of good electrical conductivity and being surrounded throughout its length by a covering of dielectric material which varies in dielectric constant from a value not substantially greater than 1 at the surface of said conductor to a value greater than 2 at the outer surface of the covering.

2. A surface wave transmission line comprising a single metallic conductor formed of a metal of good electrical conductivity and being surrounded throughout its length by a dielectric tube of larger transverse dimensions than said conductor and providing an annular space within the tube and surrounding said conductor, said dielectric tube being formed of solid dielectric material of a dielectric constant of not less than 2, and said annular space being filled with a dielectric having a dielectric constant not substantially greater than 1 at the surface of said conductor.

3. A transmission line according to claim 2 wherein said conductor and said dielectric tube are of cylindrical form, and said dielectric tube is dimensioned so that the ratio of the radial thickness of said annular space to the wall-thickness of the dielectric tube is greater than 1 and less than 6, and the ratio of the electrical wall-thickness of the tube to the free-space wave length is greater than 0.01 and less than 2.0.

4. A transmission line according to claim 2 wherein said annular space is filled with a dielectric foam.

5. A transmission line comprising a single conductor formed of a metal of good electrical conductivity and being surrounded throughout its length by a tubular covering formed of porous dielectric material which is graded in density from a very porous structure at the surface of the conductor to a dense structure at the outer diameter of the covering, the outer dense portion of said dielectric material having a dielectric constant of a value greater than 2.

References Cited in the file of this patent

UNITED STATES PATENTS

| | | |
|---|---|---|
| 2,782,251 | Ebel | Feb. 19, 1957 |
| 2,949,589 | Hafner | Aug. 16, 1960 |

FOREIGN PATENTS

| | | |
|---|---|---|
| 1,075,609 | France | Oct. 19, 1954 |
| 1,075,899 | France | Oct. 20, 1954 |

UNITED STATES PATENT OFFICE
Certificate of Correction

Patent No. 3,040,278                               June 19, 1962

John W. E. Griemsmann

It is hereby certified that error appears in the above numbered patent requiring correction and that the said Letters Patent should read as corrected below.

Column 2, line 12, for "pace" read —space—; columns 3 and 4, Equations (1) and (2) should appear as shown below instead of as in the patent:

$$\alpha_d = \left(\frac{\pi k_\epsilon \phi}{\lambda_0}\right)\left(\frac{\lambda_g}{\lambda_0}\right)\left[\frac{\gamma^2\left\{1+\frac{v^2 K_1^2(w)}{w^2 k_\epsilon^2 K_0^2(w)}+\frac{2}{wk_\epsilon^2}\left(\frac{\lambda_0}{\lambda_g}\right)^2\frac{K_1(w)}{K_0(w)}\right\}-c_2^2\left\{\frac{\alpha^2 v^2}{w^2 k_\epsilon^2}+\beta^2-\frac{2\alpha\beta}{c_2}\frac{1}{wk_\epsilon^2}\left(\frac{\lambda_0}{\lambda_g}\right)^2\right\}}{\gamma^2\left\{\frac{v^2+k_\epsilon w^2}{w^2 k_\epsilon}+\frac{2K_1(w)}{wk_\epsilon K_0(w)}\left(\frac{v^2+w^2}{w^2}\right)-\frac{v^2}{w^2}\left(\frac{k_\epsilon-1}{k_\epsilon^2}\right)\frac{K_1^2(w)}{K_0^2(w)}\right\} -c_2^2\left\{\frac{v^2\alpha^2(1-k_\epsilon)}{w^2 k_\epsilon^2}+\beta^2\left(\frac{v^2+w^2 k_\epsilon}{w^2 k_\epsilon}\right)-\frac{2\alpha\beta}{c_2}\left(\frac{v^2+w^2}{w^3 k_\epsilon}\right)+\frac{v^2}{w^4 k_\epsilon c_2^2}\right\}}\right] \quad (1)$$

$$\alpha_c = \frac{\frac{v^2}{k_\epsilon^2 w^2 (wc_1)^3}\left(\frac{R_s k_\epsilon c_1 \lambda_g}{\eta_0 b \lambda_0}\right)}{\gamma^2\left\{\frac{v^2+k_\epsilon w^2}{w^2 k_\epsilon}+\frac{2K_1(w)}{wk_\epsilon K_0(w)}\left(\frac{v^2+w^2}{w^2}\right)-\frac{v^2}{w^2}\left(\frac{k_\epsilon-1}{k_\epsilon^2}\right)\frac{K_1^2(w)}{K_0^2(w)}\right\} -c_2^2\left\{\frac{v^2\alpha^2(1-k_\epsilon)}{w^2 k_\epsilon^2}+\beta^2\left(\frac{v^2+w^2 k_\epsilon}{w^2 k_\epsilon}\right)-\frac{2\alpha\beta}{c_2}\left(\frac{v^2+w^2}{w^3 k_\epsilon}\right)+\frac{v^2}{w^4 k_\epsilon c_2^2}\right\}} \quad (2)$$

column 3, lines 46, 47 and 48 should appear as shown below instead of as in the patent:

$k_\epsilon$ = relative dielectric constant of the dielectric
$v^2 = b^2(k^2 k_\epsilon - k_z^2)$
$w^2 = -b^2(k^2 - k_z^2)$ same column 3, lines 59, 60 and 61 should appear as shown below instead of as in the patent:

$\lambda_0 = 2\pi/k$, wavelength in air, meters, corresponding to $f$
$\lambda_g$ = guide wavelength, meters same column 3, lines 68 to 70, the equation should appear as shown below instead of as in the patent:

$$\left(\frac{\lambda_g}{\lambda_0}\right)^2 = \frac{v^2+w^2}{v^2+k_\epsilon w^2}; \left(\frac{b}{\lambda_0}\right)^2 = \frac{v^2+w^2}{4\pi^2(k_\epsilon-1)}$$

Signed and sealed this 26th day of November 1963.

[SEAL]

Attest:
ERNEST W. SWIDER,
*Attesting Officer.*

EDWIN L. REYNOLDS,
*Acting Commissioner of Patents.*